Sept. 17, 1946.  I. F. MATTHYSSE  2,407,961
ROTATABLE BUS SUPPORT CLAMP
Filed Oct. 24, 1942
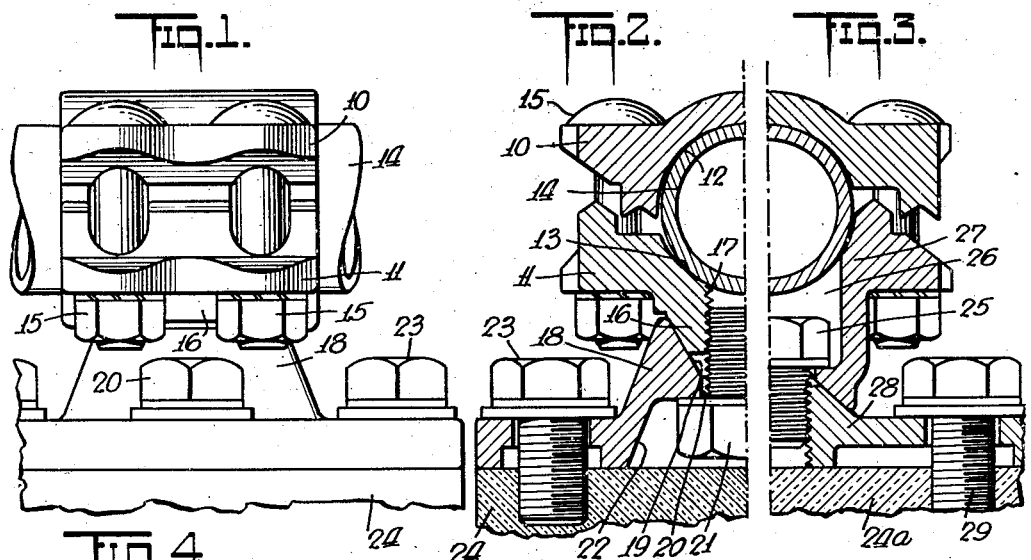
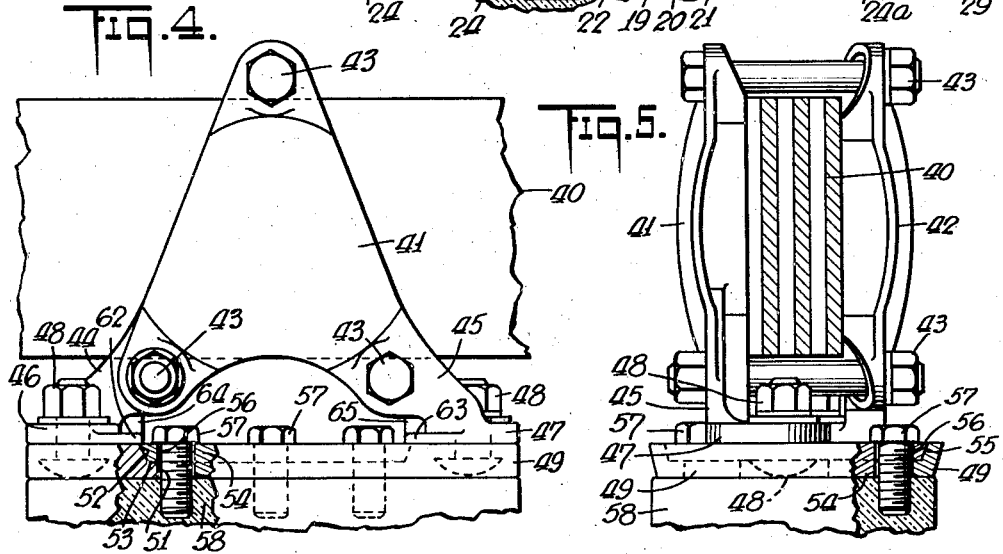
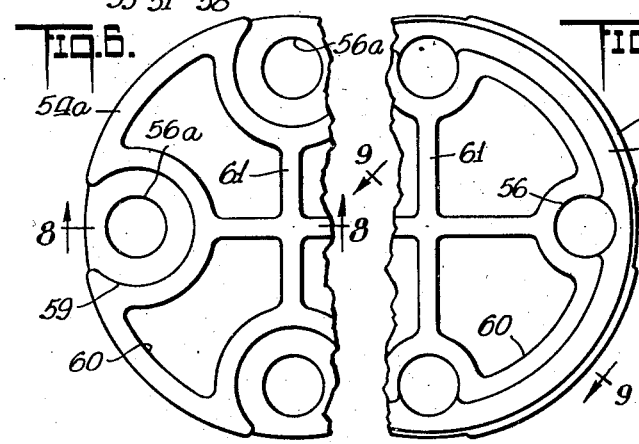
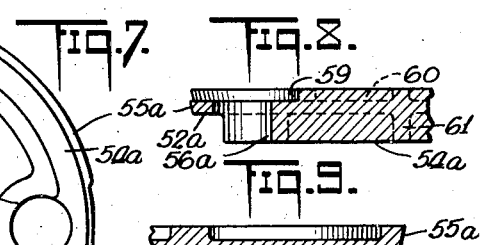
INVENTOR
*Irving Frederick Matthysse*
BY
*Harry Ernest Rubens*
ATTORNEY Patented Sept. 17, 1946

2,407,961

UNITED STATES PATENT OFFICE 2,407,961

ROTATABLE BUS SUPPORT CLAMP

Irving Frederick Matthysse, New York, N. Y., assignor to Burndy Engineering Company, Inc., a corporation of New York Application October 24, 1942, Serial No. 463,178

2 Claims. (Cl. 174—169)

This invention relates to improvements in clamps for supporting electrical conductors on insulators.

In electrical substations the electrical buses are usually retained by bus clamps mounted on insulators in turn supported on a framework of steel. The bolt and rivet holes in the steel framework are generally pre-punched. Often, because of revisions in plans, inaccuracies, or other causes, the holes for mounting the insulators may be so aligned that some compensation may be necessary in the clamp supporting the conductor for varying the angle at which the conductor is held. Therefore, it is generally desirable to use a support clamp which will allow adjustment of the angular position of the bus in the plane perpendicular to the longitudinal centerline of the insulator.

If the insulator uses a single mounting bolt, angular adjustment is obtained simply by rotation about the centerline of the mounting bolt. However, when more than one mounting bolt is used, as on insulators having four bolts spaced equally on the standard 3" or 5" bolt circles, this angular adjustment is usually accomplished by providing slots in the base of the support clamp. The adjustability thus obtained is limited to the angular length of the slots. Since long slots reduce the mechanical strength of the base and prevent the use of strengthening ribs, they must necessarily be short. A common method for obtaining a fairly large angular adjustability is to use only two mounting bolts with slots permitting 90° of adjustment. Such adjustability is obtained at a large sacrifice of strength in the base and mounting bolts.

It is the object of this invention to provide a bus support clamp providing accurate adjustment within an angular range of the bus of 360° or over the entire plane perpendicular to the insulator centerline. This is accomplished without sacrifice of strength of the base or mounting bolts. Such adjustability permits the same clamp to be used regardless of the angle at which the bus crosses the insulator, thus reducing the number of different clamps that must be purchased, and permitting compensations for revisions and inaccuracies which effect the angular position of the bus.

Another object of my invention is to provide a bus support having a center clamping disc which permits angular adjustment of the base of the supporting clamp before clamping all the parts securely together.

Still another object consists in providing means for holding the clamping disc in unitary assembly with the base of the supporting clamp.

A further object consists in providing conically-shaped male and female surfaces for adjustably rotating and securing the various parts of the bus support to the insulator, giving maximum resistance to horizontal shearing forces.

I accomplish these and other objects and obtain my new results as will be apparent from the device described in the following specification, particularly pointed out in the claims, and illustrated in the accompanying drawing, in which:

Fig. 1 is a side elevation of one form of my rotatable bus support clamp, for cylindrical buses.

Fig. 2 is a semi-sectional view of the same, illustrating the base member and clamp member supported on conical surfaces with the center bolt head in the base member.

Fig. 3 is a semi-sectional view of a modification with the center bolt head positioned in the clamp member.

Fig. 4 illustrates a side elevation of a flat sided bus support clamp employing a center clamping disc shown partly in section.

Fig. 5 is an end elevation of the same with the base partly in section.

Fig. 6 is a top view of a preferred form of center clamping disc, a part thereof being broken away.

Fig. 7 is a bottom view of the same.

Fig. 8 is a sectional view taken along 8—8 of Fig. 6.

Fig. 9 is a sectional view taken along 9—9 of Fig. 7.

Referring more particularly to the drawing, all forms of my device are designed for various types of buses whether cylindrically shaped or flat sided. In Fig. 1, a tubular bus support clamp is shown which comprises the cap and intermediate clamping members 10 and 11 respectively, having semi-cylindrical seats 12 and 13 for supporting the cylindrically shaped bus 14. The bolts 15 are used to clamp the two sections together about the bus bar.

The intermediate clamping member 11 terminates in a conical shaped section 16 having a threaded bore 17 centrally positioned therein, as shown in Fig. 2.

The base member 18 is similarly provided with a corresponding conical recess 19 having a central aperture 20 therein for the insertion of the center bolt 21, which engages the threaded bore 17 of the intermediate clamping member 11, and secures the clamping members to the base member 18. A recess 22 is provided in the bottom surface of the base member 18 for the head of the center bolt, and a lateral opening, not shown, for insertion of a wrench for tightening the center bolt is desirable.

Base bolts 23 tighten the base member 18 to the insulator cap 24.

In Fig. 3, a similar construction is shown, except that the conical surfaces are reversed, and the center bolt 25 positioned in a recess 26 of the intermediate clamping member 27 locks the intermediate clamping member to the base member 28, in turn bolted to the insulator cap 24a by the base bolts 29.

The construction in Fig. 2 may be used when the bus size is relatively small so that there is insufficient room in the clamping member for the head of the center bolt. However, when the bus is sufficiently large, it may be desirable to use the construction shown in Fig. 3 with the head of the center bolt in the recess in the intermediate member.

In Figs. 4 to 9, I have illustrated another method of obtaining the desired results. Here flat bus bars 40 are shown supported between clamping members 41 and 42 by means of the clamping bolts 43. The clamping members may each terminate in an oppositely positioned supporting leg indicated at 44 and 45, having a transverse lug designated as 46 and 47, each apertured to receive a base bolt 48, which supports the clamping members to the substantially rectangular supporting member 49.

The center portion of the supporting member 49 is provided with a circular recess 51 having a conical surface 52 and stop shoulders 53. Within the recess is seated the center clamping disc or base member 54, having a circumferential tapered seat 55. The clamping disc is apertured at 56 for the insulator bolts 57 which lock the clamping disc to the insulator cap 58.

The apertures 56 may be recessed as at 59, as shown in Figs. 6 to 9, wherein a slightly modified form of clamping disc 54a is illustrated and bolt apertures 56a and conical surface 55a, to enable the bolt heads to be substantially lowered, providing additional clearance. The clamping disc 54a is shown with recesses 60, whereby the excess metal may be eliminated wherever practical, leaving sufficient ribs and webs 61 for strength.

The clamping disc may be installed in a unitary assembly of the entire device by providing projections 62 and 63 on the lugs 46 and 47 of the supporting legs 44 and 45 respectively. When the supporting legs are bolted to the supporting member 49, the projections 62 and 63 overlap the clamping disc 54 and retain the disc in position. This is an important advantage in shipping and stocking, preventing loss by separation and avoiding separate handling. Webs 64 and 65 may extend from the projections 62 and 63 to the legs 44 and 45 respectively to reinforce the projections and provide additional strength.

By the device illustrated in Figs. 4 and 5, I can position the clamping members 41 and 42 in any horizontal position and lock the clamping members securely to the insulator cap 58 by means of the clamping disc 54, which engages the conical surfaces 52 of the supporting member 49 as the bolts 57 are tightened to the insulator cap 58.

In all the foregoing constructions, I am able to position the bus bars and clamping members in precisely the desired angular position on the insulator cap. Thus complete circular rotatability is accomplished and accuracy of positioning attained without the need of weakening angular slots in the supporting or base member. A further accomplishment consists in achieving precise horizontal adjustment without vertically separating the various parts.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained, and new results accomplished, as it is obvious that the particular embodiments herein shown and described are only some of the many that can be employed to attain these objects and accomplish these results.

What I claim and desire to secure by Letters Patent is as follows:

1. A clamp for supporting a bus bar on an insulator cap, comprising a base member having means for detachably mounting said base member to the insulator cap; a plurality of clamping members having pressure applying surfaces for gripping a bus bar; bolt means positioned on each side of the pressure applying surfaces for applying pressure uniformly to the surface of the bus bar and for locking the bus bar therebetween; means for rotating said clamping members with respect to said base member; said clamping members and base member being provided with male and female portions having relatively smooth contacting surfaces to permit rotation one on the other for facilitating the rotating movement there between and bolt means extending through the male and female portions for locking the two together in any angular position.

2. The clamp of claim 1, wherein the female portion of the base member supports the clamping members, and the male portion of the base member contains the means for detachably mounting the base member to the insulating cap.

IRVING FREDERICK MATTHYSSE.